Figure 3:
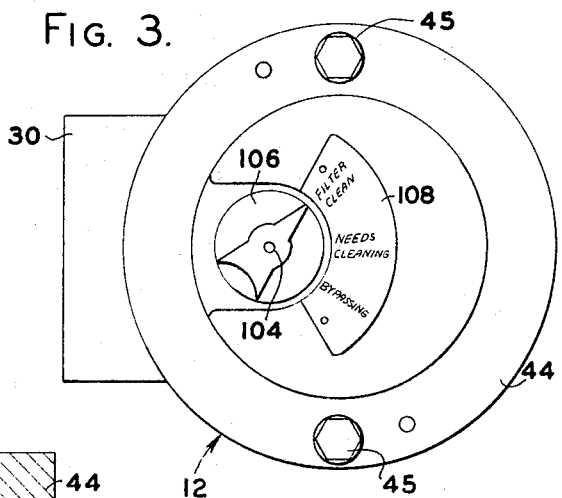

Nov. 29, 1966   O. E. ROSAEN   3,288,290
FILTER DEVICE
Filed April 14, 1965

INVENTOR.
OSCAR E. ROSAEN
BY
Hanke & Hanke
ATTORNEYS

United States Patent Office 3,288,290
Patented Nov. 29, 1966

3,288,290
FILTER DEVICE
Oscar E. Rosaen, Grosse Pointe Farms, Mich., assignor to The Rosaen Filter Company, a corporation of Michigan
Filed Apr. 14, 1965, Ser. No. 447,995
4 Claims. (Cl. 210—90)

The present invention relates to fluid systems, particularly to those fluid systems having a filter device adapted to be mounted extending into the fluid reservoir for such systems and more particularly to an improvement for such a filter device comprising means for collecting and retaining contaminant dislodged from the inlet side of the filter element as the element is being removed for purposes of cleaning or replacement.

Certain co-pending applications; Ser. Nos. 279,930 and 279,935 each having a filing date of May 13, 1963 now abandoned in favor of continuation-in-part applications Ser. Nos. 340,365 and 341,488 respectively, each filed January 27, 1964; Ser. Nos. 313,524 and 313,627 each having a filing date of October 3, 1963, disclose certain new mobile or bayonet devices which are adapted to be inserted into the reservoir of the fluid system. These new filter devices have the particular advantage that much of the housing structure heretofore necessary for filter devices is eliminated. This produces a substantial reduction in manufacturing costs for such devices. Further, the filter devices are readily accessible for removal of the filter element for cleaning or replacement and means are provided for bypassing the filter element when it reaches a predetermined clogged condition. Indicating means are provided exteriorly of the device for indicating the condition of the filter element.

These filter devices have proven to be quite satisfactory. However, it has been found that as the filter element of such devices is being removed for purposes of cleaning or replacement fluid within the filter element tends to flow in a reverse direction from the outlet side of the element to the inlet side of the element. This reverse flow or backwash tends to dislodge some amount of foreign particles back into the reservoir of the fluid system where they can upon resumption of the fluid system again tend to clog the filter element. The present invention provides an improvement for such filter devices by providing means in the form of an inner substantially cylindrical housing member substantially encompassing the surface on the inlet side of the filter element and having a portion extending across the interior end of the element so that as the filter element is being removed foreign particles dislodged from the element are collected and retained in the inner housing and are removed from the system with the filter element.

It is an object then of the present invention to improve filter devices such as those disclosed in the aforementioned copending applications by providing means removable with the filter element for collecting and retaining contaminants dislodged from the filter element as the filter element is being removed for cleaning or replacement.

It is still another object of the present invention to increase the effective life of filter elements for mobile or bayonet filter devices or the like by providing an inner housing member spaced from but substantially encompassing the filter element to provide a means for collecting and removing contaminants dislodged from the filter element during removal thereof.

Figure 2:
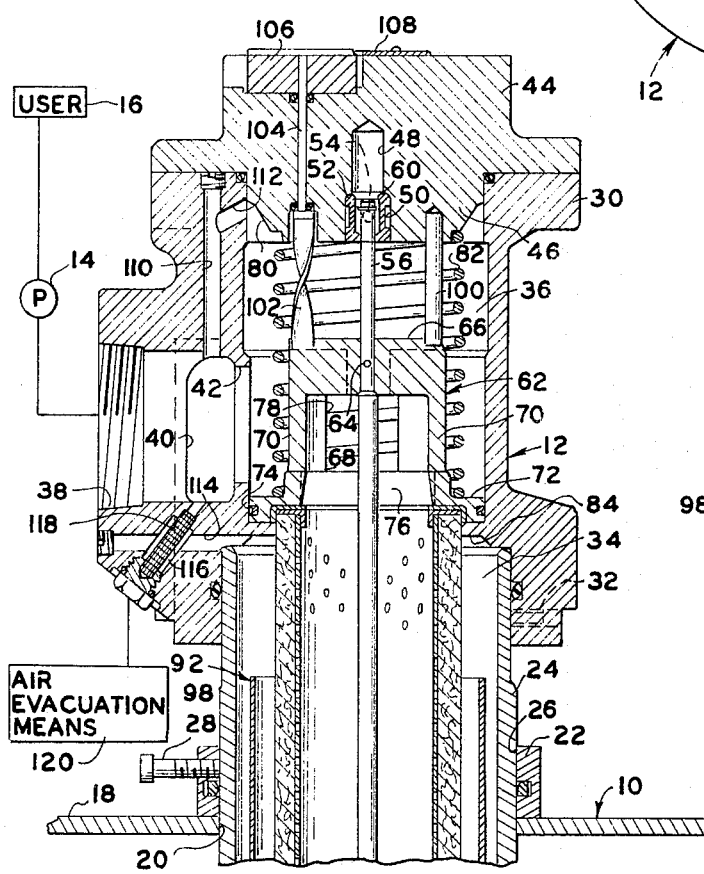
Figure 1:
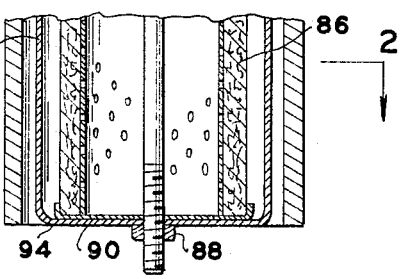

Still further objects and advantages of the present invention will be readily apparent to one skilled in the art to which the invention pertains upon reference to the following drawings in which like reference characters refer to like parts throughout the several views and in which, FIG. 1 is a longitudinal cross-sectional view of a preferred filter device of the present invention with portions of a preferred fluid system illustrated diagrammatically, FIG. 2 is a cross-sectional view taken substantially at line 2—2 of FIG. 1, and FIG. 3 is a top elevational view of the preferred device shown in FIG. 1.

Now referring to the drawings for a more detailed description of the present invention, a preferred fluid system is illustrated as comprising a fluid reservoir 10, a filter device 12, a fluid pump 14, and a fluid user 16. The fluid reservoir 10 preferably comprises a top plate 18 and is at least partially filled with a suitable fluid (not shown). An opening 20 is provided in the plate 18. The filter device 12 preferably comprises a mounting member 22 carried by the top plate 18 of the reservoir 10. An elongated tubular housing member 24 extends through an opening 26 provided in the mounting members 22 and through the opening 20 provided in the top plate 18 into the reservoir 10. The tubular housing member 24 is adjustably secured to the mounting member 22 by means of bolts or screws 28.

The filter device 12 preferably further comprises a housing member 30 closing the upper end of the tubular housing member 24 and secured thereto by bolts or screws 32. The tubular housing member 24 forms a filter chamber 34 and the housing member 30 forms an outlet chamber 36 in communication with the filter chamber 34. The housing member 30 is provided with an outlet 38 opening radially to the outlet chamber 36 through a substantially annular chamber 40 and a port 42.

A cap member 44 is preferably secured to the housing member 30 by any convenient means such as bolts or screws as 45 as shown in FIG. 3 and closes the outlet chamber 36. The cap member 44 is provided with a boss portion 46 extending into the housing member 30 and having an axial recess 48 having a radially enlarged portion 50. A cylindrical cup member 52 is carried in the enlarged portion 50 of the recess 48 my means of a set screw 54. An elongated rod 56 extends axially through an opening 58 provided in the cap 44 and is axially slidably mounted in the cup member 52. Separation of the cup member 52 and the rod 56 is prevented by a snap ring 60.

A porting member 62 is fixed to the rod 56 by means of a pin 64 to move axially therewith in the outlet chamber 36. The porting member 62 comprises an upper substantially annular radially extending portion 66 and a lower annular radially extending portion 68 joined by a plurality of axially extending legs 70. The lower portion 68 is provided with peripheral flange 72 which carries a piston ring 74 engaging the inner wall of the housing member 30. The lower portion 68 is also provided with a central opening 76 communicating with the interior of the filter chamber 34. The legs 70 define annularly spaced ports 78 providing communication between the central opening 76 and the outlet 38 through the port 42 and the chamber 40.

The boss portion 46 of the cap member 44 is further provided with a recessed portion 80 which forms a seat for one end of the spring 82. The other end of the spring 82 is seated against the lower portion 68 of porting member 62 and urges the porting member 62 axially away from the cap member 44 and against an internal and ported shoulder 84 provided in the housing member 30.

The rod 56 is enlarged somewhat axially downwardly of the pin 64 and extends through the porting member 62 and into the filter chamber 34. A substantially cylindrical filter element 86 is carried by the rod 56 within the filter chamber 34 and is locked against the lower portion 68 of the porting member 62 by means of a nut 88 and a closure plate 90 carried by the rod 56.

An inner housing member 92 is provided with a lower circular plate portion 94 centrally perforated to be received by the free end of the rod 86 and a substantially cylindrical side wall portion 96 integrally connected to the end plate 94 and extending axially upwardly into the filter chamber 34 in a position radially spaced from the exterior surface of the filter element 86. The inner housing member 92 is preferably locked to the rod 56 by the nut 88. The plate portion 94, the sidewall portion 96, and the exterior surface of the filter element 86 define an annular axially elongated contaminant collection chamber 98.

The upper portion 66 of the porting members 62 is slotted to receive a guide pin 100 and an actuator element 102. The actuator element 102 is twisted about its longitudinal axis and is secured to a shaft 104 which is in turn secured to a pointer element 106 carried exteriorly of the cap member 44 so that axial movement of the actuator element 102 produces a corresponding rotational movement of the shaft 104 and the pointer element 106. The pointer element 106 rotates with the shaft 104 and points to suitable indicia 108, as can best be seen in FIG. 3, provided on the exterior surface of the cap member 44. It is apparent then that upon axial movement of the ring member 62 the actuator element 102 engages in the slot provided in the upper annular portion 66 to produce a corresponding rotation of the shaft 104 and the pointer element 106 so that if suitable indicia is provided on the exterior surface of the cap member 44 the axial position of the porting member 62 will be indicated by the pointer element 106.

The housing member 30 is provided with an axially extending passage 110 registering at its lower end with the upper portion of the annular chamber 40 and at its upper end with generally radially inwardly extending passage 112 which in turn registers with the upper portion of the outlet chamber 36. The housing member 30 is further provided with a radially inwardly extending passage 114 registering with the upper portion of the filter chamber 34. A passage 116 intersects the passage 114 and is provided with a filter member 118. The passage 116 is preferably connected to a suitable air evacuation means 120.

In operation fluid is normally pumped by the pump 14 from the reserevoir 10 and into the filter chamber 34, axially downwardly into the collection chamber 98 and radially inwardly through filter element 86 axially upwardly through the opening 76 and through the ports 78 provided in the porting member 62, and into the outlet chamber 36 and through the outlet 38 to the user 16.

As the filter element 86 becomes clogged an increase in pressure differential across the element will be produced. Since the upper surface of the flange 72 of porting member 62 is exposed to pressure on the outlet side of the filter element 86 and the lower surface of flange 72 is exposed to pressure on the inlet side of the filter element 86 when the increased pressure differential reaches a value sufficient to overcome the force exerted by the spring 82, the porting member 62 will move axially toward the cap member 44. As has been heretofore pointed out, each change in the axial position of the porting member 62 will produce a corresponding change in the position of the pointer element 106. Thus with proper indicia 108 on the exterior surface of the cap member 44 the clogged condition of the filter element 86 will be visibly indicated exteriorly of the filter device 12.

As the filter element 86 continues to become clogged and prior to the danger of the increased differential across the element 86 causing the same to rupture, the porting member 62 will have moved axially sufficiently to open a fluid path directly from the inlet side of the filter element 86 past the flange 72 of porting member 62 and into the outlet chamber 36 to the outlet 38.

During operation of the filter system the pump 14 causes air which would otherwise become entrapped within the filter housing 30 to be drawn from the upper portion of the outlet chamber 36 through the passages 112 and 110 and out the outlet 38. Further, air which would normally become entrapped in the upper portion of the filter chamber 34 on the inlet side of the filter element 86 will be drawn by the pump 14 through the passages 114 and 116 to the outlet 38. The filter member 118 insures that any fluid that bypasses the filter element 86 with the entrapped air during operation of the system will become filtered before passing through the outlet 38.

When it is desired to remove the filter element 86 for cleaning or replacement the cap member 44 is removed. The removal of the cap member 44 will cause the porting member 62 and the filter element 86 to be removed from the device 12 since each of these elements is secured one to the other. As the cap member 44, the porting member 62, and the filter element 86 are being removed for purposes of cleaning or replacement of the filter element 86 a certain amount of backflow or radially outward flow of fluid through the filter element 86 is produced. In the filter devices heretofore disclosed no means were provided for collecting and retaining the foreign particles dislodged from the exterior surface of the filter element 86 produced by this backflow. Thus such foreign particles would tend to fall back into the reservoir 10 to again collect and accumulate upon the exterior surface of the filter element 86 as the system is again set into operation. In the present invention, such foreign particles or contaminants are collected in the collection chamber 98 and are removed from the system with the filter element 86.

After the filter element 86 has been cleaned or replaced and the collection chamber 98 has been cleaned and the filter element 86, the inner housing member 82, and the porting member 62 are installed back into the filter device 12 the air evacuation means 120 is actuated to removed air trapped in the upper portion of the outlet chamber 36 by means of passages 114 and 112 and 116 and also to remove trapped air from the upper portion of the filter chamber 34 on the inlet side of the filter element 86 by means of passages 114 and 116 .

It is apparent that although I have described but a single embodiment of my invention many changes and modifications can be made therein without departing from the spirit of the invention as expressed by the appended claims.

I claim:

1. In combination with a fluid reservoir having an upper wall, a filter device comprising
    (a) a tubular member having an open inlet end and an open end opposite said inlet end,
    (b) means positioning said tubular member to depend from said upper wall of said reservoir vertically into said reservoir with the inlet end below the level of fluid in said reservoir and said opposite end disposed exteriorly of said upper wall,
    (c) a housing structure including a portion mounted to said opposite end of said tubular member and provided with an outlet,
    (d) a filter assembly and means slidably mounting said filter assembly in said tubular member intermediate said inlet end and said outlet end; and said filter assembly including an annular filter element having an outer surface in communication with said inlet end and an inner surface in communication with said outlet, and
    (e) an inner imperforate housing member secured to said filter assembly and including a first portion spaced outwardly from said outer surface of said filter element and surrounding a portion of same adjacent the inlet end of said tubular member to define a collection chamber therebetween and a second portion closing the end of said collection chamber adjacent said inlet end of said tubular member.

2. The combination as defined in claim 1 and in which said filter device includes
   (a) pressure responsive means moving said filter assembly axially within said tubular member in response to changes in the pressure differential across said filter element,
   (b) indicator means actuated by said filter assembly to indicate the axial position thereof and thereby indicate the condition of said filter element.

3. The combination as defined in claim 1 and in which said filter device includes
   (a) a pressure responsive means moving said filter assembly axially within said tubular member in response to changes in the pressure differential across said filter element,
   (b) valve means actuated by said filter assembly to open a fluid path directly from said inlet end to said outlet upon said filter assembly being moved to a predetermined axial position by said pressure responsive means.

4. The combination as defined in claim 1 and in which said inner housing further comprises,
   (a) said first portion being cylindrical, and
   (b) said second portion being circular and integral with the lower end of said first portion and being secured to the lower end of said filter element.

References Cited by the Examiner

UNITED STATES PATENTS

| | | | |
|---|---|---|---|
| 2,057,779 | 10/1936 | Jacobs | 210—172 |
| 2,300,952 | 11/1942 | May | 210—456 |
| 2,575,900 | 11/1952 | Vokes | 210—131 |
| 2,983,384 | 5/1961 | Winslow | 210—130 X |
| 2,994,403 | 8/1961 | Winslow | 210—304 X |

FOREIGN PATENTS 240,347   8/1962   Australia.

REUBEN FRIEDMAN, *Primary Examiner.*

SAMIH N. ZAHARNA, *Assistant Examiner.*